Patented Mar. 16, 1954

UNITED STATES PATENT OFFICE 2,672,418

LIGHT-SENSITIVE DIAZOTYPE MATERIAL

Wilhelm Neugebauer and Martha Tomanek, Wiesbaden-Biebrich, and Hans Böttger, Wiesbaden, Germany, assignors, by mesne assignments, to Keuffel & Esser Co., Hoboken, N. J., a corporation of New Jersey No Drawing. Application January 4, 1951,
Serial No. 204,496

Claims priority, application Germany
January 17, 1950

7 Claims. (Cl. 95—6)

The present invention relates to new diazotype photosensitive material which may be used for the production of color fast diazotype prints. More particularly, it relates to photosensitive diazotype material containing diazo compounds of a specific group of para-diaminobenzenes principally in combination with 2,3-dihydroxy-naphthalene-6-sulfonic acid as an azo coupling component.

2,3-dihydroxy-naphthalene and its derivatives are disclosed as azo coupling components for the diazotype process in U. S. Patent No. 2,196,950. The patent discloses that these azo coupling components may be employed in combination with basic diazo compounds for the production of blue and black line diazotype light sensitive papers. Since the discovery of these azo coupling components, the combination of 2,3-dihydroxy-naphthalene-6-sulfonic acid or its salts with 1-diazo-4-diethyl-aminobenzene has been frequently used in practice.

The prints obtained from this combination have very beautiful blue and black tints, high contrast and other valuable properties. However, the prints obtained have the disadvantage that during storage under ordinary conditions (i. e. free of ammonia) the color shade frequently changes in a rather unfavorable manner. The color of the blue line prints changes from blue to a muddy, cloudy violet and brown and the color of the black line prints changes from black to brown. This color change is accelerated if the copies are exposed to air of an elevated temperature and high humidity.

Now it has been found that valuable diazotype copies can be obtained by using 2,3-dihydroxy-naphthalene-6-sulfonic acid and its salts preferably the sodium salt as azo coupling components if the light-sensitive layer contains as the light-sensitive substance a diazo compound of an N,N-dialkyl-para-diamine of the formula

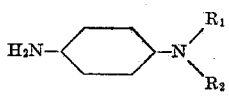

wherein $R_1$ represents n-1-propyl, substituted with one or two methyl groups or with one ethyl group, and $R_2$ represents methyl or n-1-propyl, the latter of which may also be substituted with one or two methyl groups or one ethyl group respectively.

Other suitable substituents may be contained in the benzene nucleus, for example, alkyl or alkoxy groups or both.

The light-sensitive material for the preparation of the prints may be prepared in known manner as a so-called one-component-paper (for the so-called wet development process) or as a so-called two-component-paper (for the so-called dry development process). It will be understood that the light-sensitive layer for the two component paper must contain 2,3-dihydroxy-naphthalene-6-sulfonic acid or one of its salts as the azo coupling component in addition to the diazo compound. In order to avoid premature coupling or decomposition of the diazo compound the usual stabilizers may be added. The base material for the light-sensitive layer will usually consist of paper but other base materials may be used, for example, cellulose acetate foil.

The diazo compounds are prepared in known manner from para-diamino-benzenes in which one of the amino groups is tertiary. They represent yellow crystalline compounds soluble in water.

The diazotype copies which are obtained according to this invention are provided with valuable blue and black images of very high contrast and also possess the other valuable properties of diazotype copies prepared with 2,3-dihydroxy-naphthalene-6-sulfonic acid and its salts as azo coupling components. The prints are distinguished from copies prepared from 1-diazo-4-diethyl-amino-benzene and 2,3-dihydroxynaphthalene-6-sulfonic acid sodium salt by greatly increased ability to be stored under unfavorable conditions without any disadvantageous change of color.

The following examples are given in order to illustrate the present invention.

(1) 2.2 g. of the zinc chloride double salt of the diazo componud obtained from 1-amino-4-N,N-di-n-propyl-amino-benzene are dissolved in distilled water together with 6.0 g. of citric acid,
2.0 g. of aluminum sulfate,
1.6 g. of 2,3-dihydroxy-naphthalene-6-sulfonic acid sodium salt,
5.0 g. of thiourea, and
4.0 g. of naphthalene-1,3,6-trisulfonic acid sodium salt and diluted to a total volume of 100 cc. Paper is coated with this solution in the usual manner to form a two component light-sensitive material, dried and exposed to actinic light under a positive master. After development with gaseous ammonia, blue copies of high contrast and clear background are obtained. As compared with images obtained by using 1-diazo-4-diethyl-amino-benzene, the color has somewhat of a greenish tint. This fact makes the new combinations very suitable for use with other components in order to form black images. The light-sensitivity of the diazo compound obtained from 1-amino-4-N,N-di-n-propyl-amino-benzene is found to be equal with that of the diazo compound obtained from 1-diazo-4-diethyl-amino-benzene. The print has improved fastness to water. Even under unfavorable storage conditions the color of these prints does not change to a brown tint.

(2) The diazo compound mentioned in Example 1 is replaced by 2.5 g. of the cadmium chloride double salt of the diazo compound prepared from 1-amino-4-N-n-propyl-N-n-butyl-amino-benzene. After exposure to actinic light and development of the coated paper, prints are obtained which are distinguished by a strong blue shade. The shade of this blue image is, as mentioned in Example 1, somewhat greener than that of prints obtained with 1-diazo-4-diethyl-amino-benzene. The copies have improved fastness to water and do not change color.

(3) Under the same conditions as stated in Example 1 2.4 g. of the zinc chloride double salt of the diazo compound prepared from 1-amino-4-N,N-di-n-butyl-amino-benzene are used. Strong, somewhat greenish blue shades of an excellent fastness to water are obtained. The copies are distinguished by a high color stability during storage.

Very good results with regard to the color stability of the blue images produced may also be obtained if any of the following are used as the light-sensitive substance in the manner stated in Example 1:

2.3 g. of the cadmium chloride double salt of the diazo compound prepared from 1-amino-4-N-methyl-N-isobutyl-amino-benzene, 2.7 g. of the cadmium chloride double salt of the diazo compound prepared from 1-amino-4-N-n-butyl-N-iso-amyl-amino-benzene, or 2.6 g. of the zinc chloride double salt of the diazo compound prepared from 1-amino-4-N,N-di-iso-amyl-amino-benzene.

(4) 2.3 g. of the zinc chloride double salt of the diazo compound prepared from 1-amino-2-methyl-4-di-n-propyl-amino-benzene are dissolved in distilled water together with 5.0 g. of tartaric acid,
1.0 g. of aluminum sulfate,
1.6 g. of 2,3-dihydroxy-naphthalene-6-sulfonic acid sodium salt,
5.0 g. of thiourea, and
3.0 g. of 1,3,6-naphthalene-trisulfonic acid sodium salt and diluted to a total volume of 100 cc. Paper is sensitized with this solution in the usual manner and, after exposure to actinic light and development with gaseous ammonia, blue images are obtained which have an even more greenish shade than copies obtained with 1-diazo-4-di-n-propyl-amino-benzene, mentioned in Example 1. The images obtained are extremely color-stable and resistant to water. The coated papers are also distinguished by a very good shelf-life.

(5) The diazo compound of Example 4 is replaced by 2.4 g. of the zinc chloride double salt of the diazo compound prepared from 1-amino-2-methoxy-4-di-n-propyl-amino-benzene. This makes the prints even more greenish in color than those obtained according to Example 4. They also do not change color and are very resistant to water. The coupling energy of the diazo compound is even lower than that of the diazo compound disclosed in Example 4, and the light-sensitive material is distinguished by a very high capacity for long storage.

(6) 2.5 g. of the zinc chloride double salt of the diazo compound prepared from 1-diazo-4-di-n-propyl-amino-benzene are dissolved in distilled water together with 0.5 g. of citric acid,
0.5 g. of aluminum sulfate,
5.0 g. of thiourea, and
6.0 g. of ammonium chloride and diluted to a total volume of 100 cc. Paper is coated with this solution in the usual manner to form a one component light-sensitive material, dried and exposed to actinic light under a master. After development with a solution prepared by dissolving 4.0 g. of 2,3-dihydroxy-naphthalene-6-sulfonic acid sodium salt,
4.0 g. of sodium carbonate,
1.4 g. of caustic soda, and
20.0 g. of potassium chloride in
100 cc. of water prints with deep blue tints are obtained which, even if stored in air of high humidity at 40° C., show the same high color stability as the copies prepared from the two-component light-sensitive materials described in Examples 1 to 5.

(7) 4.50 g. of the zinc chloride double salt of the diazo compound prepared from 1-amino-4-N,N-di-n-propyl-amino-benzene are dissolved in distilled water together with 6.00 g. of citric acid,
1.00 g. of aluminum sulfate,
1.80 g. of 2,3-dihydroxy-naphthalene-6-sulfonic acid sodium salt,
0.15 g. of resorcinol,
4.00 g. of thiourea,
4.00 g. of 1,3,6-naphthalene-trisulfonic acid sodium salt,
2.00 g. of zinc chloride, and
2.00 cc. of triglycolic acid and diluted to a total volume of 100 cc. Paper is coated with this solution in the usual manner, dried and exposed to actinic light under a positive master. After developing with gaseous ammonia a deep black print is obtained which, even if stored under unsuitable conditions, does not show the color change which is to be seen if the diazo compound prepared from 1-amino-4-diethyl-amino-benzene is used in the above described solution instead of the diazo compound obtained from 1-amino-4-di-n-propyl-amino-benzene.

After having fully disclosed and described our present invention, we claim:

1. As a new article of manufacture diazotype photosensitive material comprising a base and a light-sensitive layer on said base containing an azo coupling component selected from the group consisting of 2,3-dihydroxy-naphthalene-6-sulfonic acid and its salts and a diazo compound of a para-diamino-benzene selected from the group consisting of N,N-dialkyl-p-diamino-benzenes of the general formula

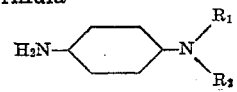

wherein $R_1$ stands for a member of the group consisting of n-1-propyl, n-1-propyl substituted with a methyl group, n-1-propyl substituted with two methyl groups and n-1-propyl substituted with an ethyl group, $R_2$ stands for a member of the group consisting of methyl, n-1-propyl, n-1-propyl substituted with a methyl group, n-1-propyl substituted with two methyl groups and n-1-propyl substituted with an ethyl group, and said N,N-dialkyl-p-diamino benzenes substituted in the nucleus with at least one group selected from alkyl and alkoxy groups.

2. As a new article of manufacture diazotype photosensitive material compriisng a base and a light-sensitive layer on said base containing a diazo compound of 1-amino-4-N,N-dipropyl-aminobenzene and an azo coupling component selected from the group consisting of 2,3-dihydroxy-naphthalene-6-sulfonic acid and its salts.

3. As a new article of manufacture diazotype photosensitive material comprising a base and a light-sensitive layer on said base containing a diazo compound of 1-amino-4-N,N-dibutyl-aminobenzene and an azo coupling component selected from the group consisting of 2,3-dihydroxy-naphthalene-6-sulfonic acid and its salts.

4. As a new article of manufacture diazotype photosensitive material comprising a base and a light-sensitive layer on said base containing a diazo-compound of 1-amino-2-methyl-4-N,N-dipropylaminobenzene and an azo coupling component selected from the group consisting of 2,3-dihydroxy-naphthalene-6-sulfonic acid and its salts.

5. As a new article of manufacture diazotype photosensitive material comprising a base and a light-sensitive layer on said base containing a diazo compound of 1-amino-2-methoxy-4-N,N-dipropylaminobenzene and an azo coupling component selected from the group consisting of 2,3-dihydroxy-naphthalene-6-sulfonic acid and its salts.

6. As a new article of manufacture diazotype photosensitive material comprising a base and a light-sensitive layer on said base containing a diazo compound of 1-amino-4-N-methyl-N-butyl-aminobenzene and an azo coupling component selected from the group consisting of 2,3-dihydroxy-naphthalene-6-sulfonic acid and its salts.

7. The process of producing diazo prints which comprises acting with an alkaline solution of an azo coupling component selected from the group consisting of 2,3-dihydroxy naphthalene - 6 - sulfonic acid and its salts upon a diazo-type layer exposed to light under a master and containing a diazo compound of a para-diamino-benzene selected from the group consisting of N,N-dialkyl-p-diamino-benzenes of the general formula

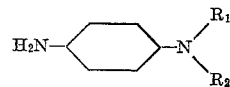

wherein $R_1$ stands for a member of the group consisting of n-1-propyl, n-1-propyl substituted with a methyl group, n-1-propyl substituted with two methyl groups and n-1-propyl substituted with an ethyl group, $R_2$ stands for a member of the group consisting of methyl, n-1-propyl, n-1-propyl substituted with a methyl group, n-1-propyl substituted with two methyl groups and n-1-propyl substituted with an ethyl group, and said N,N-dialkyl-p-diaminobenzenes substituted in the nucleus with at least one group selected from alkyl and alkoxy groups.

WILHELM NEUGEBAUER.
MARTHA TOMANEK.
HANS BÖTTGER.

References Cited in the file of this patent
UNITED STATES PATENTS

| Number | Name | Date |
|---|---|---|
| 2,196,950 | Zahn et al. | Apr. 9, 1940 |
| 2,233,038 | Sus et al. | Feb. 25, 1941 |
| 2,405,523 | Sease et al. | Aug. 6, 1946 |
| 2,531,485 | Von Glahn | Nov. 28, 1950 |
| 2,532,126 | Slifkin et al. | Nov. 28, 1950 |